US009537152B2

(12) United States Patent
Tanaka et al.

(10) Patent No.: US 9,537,152 B2
(45) Date of Patent: Jan. 3, 2017

(54) COLLECTOR FOR BIPOLAR LITHIUM ION SECONDARY BATTERIES

(75) Inventors: Yasuyuki Tanaka, Ayase (JP); Masami Yanagida, Settsu (JP); Kohei Ogawa, Settsu (JP); Satoshi Oku, Settsu (JP); Masahiro Kojima, Settsu (JP); Takashi Kikuchi, Settsu (JP); Takashi Ito, Settsu (JP)

(73) Assignees: Nissan Motor Co., Ltd., Yokohama-Shi, Kanagawa (JP); Kaneka Corporation, Osaka-Shi, Osaka (JP)

( * ) Notice: Subject to any disclaimer, the term of this patent is extended or adjusted under 35 U.S.C. 154(b) by 452 days.

(21) Appl. No.: 14/233,980

(22) PCT Filed: Jul. 18, 2012

(86) PCT No.: PCT/JP2012/068143
§ 371 (c)(1),
(2), (4) Date: Jan. 21, 2014

(87) PCT Pub. No.: WO2013/015159
PCT Pub. Date: Jan. 31, 2013

(65) Prior Publication Data
US 2014/0147746 A1 May 29, 2014

(30) Foreign Application Priority Data
Jul. 26, 2011 (JP) ................................. 2011-163258

(51) Int. Cl.
*H01M 4/66* (2006.01)
*H01M 10/0525* (2010.01)

(52) U.S. Cl.
CPC ............. *H01M 4/667* (2013.01); *H01M 4/666* (2013.01); *H01M 4/668* (2013.01); *H01M 10/0525* (2013.01); *Y02E 60/122* (2013.01)

(58) Field of Classification Search
CPC ...... H01M 4/667; H01M 4/666; H01M 4/668; H01M 10/0418; H01M 10/585; H01M 10/7011; H01M 10/0525
See application file for complete search history.

(56) References Cited

U.S. PATENT DOCUMENTS

| 9,077,040 B2 | 7/2015 | Honda et al. |
| 2004/0126654 A1 | 7/2004 | Sudano et al. |

(Continued)

FOREIGN PATENT DOCUMENTS

| CN | 101997144 A | 3/2011 |
| CN | 102511098 A | 6/2012 |

(Continued)

OTHER PUBLICATIONS

Communication with extended European search report dated Dec. 3, 2014 from the corresponding European application No. 12817058.6.

*Primary Examiner* — Jayne Mershon
(74) *Attorney, Agent, or Firm* — Young Basile Hanlon & MacFarlane, P.C.

(57) ABSTRACT

A collector for bipolar lithium ion secondary batteries comprises a first conductive layer that is obtained by adding a conductive filler to a base that contains an imide group-containing resin, and a second conductive layer that has a function of blocking lithium ions. The second conductive layer comprises a blocking resin layer that is obtained by adding a conductive filler to a base that contains a resin which contains no imide group, and a metal layer. This collector for bipolar lithium ion secondary batteries is used in such a manner that the first conductive layer is on the positive electrode active material layer side with respect to the second conductive layer.

5 Claims, 3 Drawing Sheets

(56) References Cited

U.S. PATENT DOCUMENTS

| | | |
|---|---|---|
| 2008/0220330 A1 | 9/2008 | Hosaka et al. |
| 2010/0330425 A1 | 12/2010 | Lopatin et al. |
| 2011/0206974 A1* | 8/2011 | Inoue .................. H01M 4/043 |
| | | 429/149 |
| 2012/0189912 A1 | 7/2012 | Honda et al. |
| 2012/0208082 A1 | 8/2012 | Honda |

FOREIGN PATENT DOCUMENTS

| | | |
|---|---|---|
| EP | 2530769 A1 | 12/2012 |
| JP | 2006185854 A | 7/2006 |
| JP | 2006190649 A | 7/2006 |
| JP | 2010092664 A | 4/2010 |
| JP | 2010176987 A | 8/2010 |
| JP | 2011060560 A | 3/2011 |
| TW | 201106524 A | 2/2011 |
| WO | 2011062065 A1 | 5/2011 |

* cited by examiner

COLLECTOR FOR BIPOLAR LITHIUM ION SECONDARY BATTERIES

CROSS REFERENCE TO RELATED APPLICATION

The present application claims priority to Japanese Patent Application No. 2011-163258, filed Jul. 26, 2011, incorporated herein in its entirety.

TECHNICAL FIELD

The present invention relates to a current collector for a bipolar lithium ion secondary battery, an electrode for a bipolar lithium ion secondary battery using the current collector, and a bipolar lithium ion secondary battery.

BACKGROUND

In recent years, hybrid vehicles (HEV), electric vehicles (EV) and fuel cell vehicles have been manufactured and sold in the aspects of the environmental effect and fuel consumption, and further development of these vehicles is being carried out. In such electric-powered vehicles, the use of chargeable-dischargeable power sources is essential. As for such power sources, secondary batteries such as lithium ion batteries and nickel hydride batteries, and electric double-layer capacitors are generally used. Among these, lithium ion secondary batteries are particularly preferable for used in electric-powered vehicles because of high energy density and high resistance to repeated charge and discharge, and various efforts toward development of such secondary batteries are being made. Here, when a secondary battery is used as a power source for driving a motor for use in the above-mentioned electric-powered vehicles, plural secondary batteries are required and connected in series in order to ensure high output power.

However, if the batteries are connected via connectors, output power decreases because of electric resistance of the connectors. In addition, the batteries including the connectors are at a disadvantage in terms of space. Thus, the connectors cause a decrease in output density and energy density of the batteries.

As for the measures to solve the above-mentioned problems, development of bipolar secondary batteries such as bipolar lithium ion secondary batteries is being carried out. Bipolar secondary batteries include a power generation element in which plural bipolar electrodes each provided with a positive electrode active material layer on one surface of a current collector and a negative electrode active material layer on the other surface of the current collector, are stacked on top of each other via electrolyte layers or separators.

The current collector used in such a bipolar secondary battery is preferably light and made from a material having high electric conductivity in order to ensure a larger output density. In view of this, there have been proposed current collectors (resin current collectors) using polymer materials to which electrically conductive materials are added. For example, Japanese Patent Unexamined Publication No. 2006-190649 discloses a resin current collector including a polymer material in which metal particles or carbon particles are added as an electrically conductive material.

SUMMARY

However, the resin current collector as disclosed in Patent Literature 1 has low isolation performance to isolate lithium ions contained in an electrolysis solution. It was revealed that, when such a resin current collector is used in a bipolar lithium ion secondary battery, the lithium ions enter inside the resin current collector included in the bipolar electrode and as a result, the lithium ions remain absorbed inside the current collector. The absorbed lithium ions are hardly released outside the current collector, which may cause a decrease in battery capacity.

Here, the resin included in the resin current collector is preferably hardly deformed by heat treatment or pressure treatment when manufacturing a battery and hardly dissolved in a solvent in an electrolysis solution, and preferably has high heat resistance, strength and solvent resistance. As for the resin having such characteristics, imide group-containing resin such as polyimide is preferable; however, it was also revealed that the lithium ions are absorbed inside the resin current collector significantly when using the imide group-containing resin.

The present invention has been made in view of the above-described conventional problems. An object of the present invention is to provide a resin current collector containing imide group-containing resin for use in a bipolar lithium ion secondary battery, and capable of reducing absorption of lithium ions inside the current collector.

The inventors of the present invention devoted themselves to continuous studies to solve the above-described problems. The studies by the inventors revealed a mechanism of permeation and absorption of lithium ions into a resin current collector. The inventors found out that the permeation and absorption of the lithium ions can be significantly reduced by providing, in the resin current collector containing imide group-containing resin, an isolation resin layer containing resin not containing imide group and a metal layer, thereby completing the present invention.

A current collector for a bipolar lithium ion secondary battery according to an aspect of the present invention includes: a first electrically conductive layer in which electrically conductive filler is added to a substrate containing imide group-containing resin; and a second electrically conductive layer that functions to isolate lithium ions. The second electrically conductive layer includes: an isolation resin layer in which electrically conductive filler is added to a substrate containing resin not containing imide group; and a metal layer. The first electrically conductive layer is located in a manner such that a positive electrode active material layer is closer thereto than the second electrically conductive layer.

BRIEF DESCRIPTION OF DRAWINGS

The description herein makes reference to the accompanying drawings wherein like reference numerals refer to like parts throughout the several views, and wherein.

DESCRIPTION OF EMBODIMENTS

Figure 1:
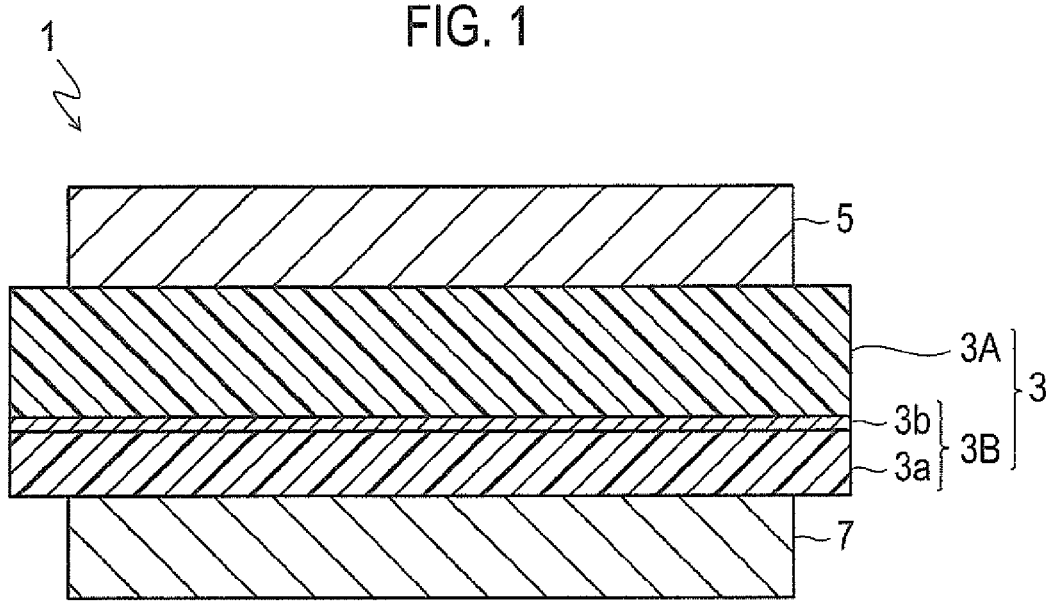
FIG. 1 is a cross-sectional view schematically showing the entire structure of an electrode for a bipolar lithium ion secondary battery using a current collector for a bipolar lithium ion secondary battery according to an embodiment of the present invention.

Hereinafter, preferable embodiments according to the present invention will be explained with reference to the drawings; however, the scope of the present invention should be defined based on the claims and is not limited to the embodiments described below. It should be noted that the same elements in the following explanations of the drawings are indicated by the same reference numerals, and overlapping explanations thereof will be omitted. In addition, dimensional ratios in the drawings are magnified for convenience of explanation and may be different from actual ratios. In the following explanations, a current collector for a bipolar lithium ion secondary battery may be simply referred to as "a current collector", an electrode for a bipolar lithium ion secondary battery may be simply referred to as "a bipolar electrode", and a bipolar lithium ion secondary battery may be simply referred to as "a bipolar secondary battery" according to circumstances.

<Current collector, Bipolar electrode> FIG. 1 is a cross-sectional view schematically showing the entire structure of an electrode for a bipolar lithium ion secondary battery using a current collector for a bipolar lithium ion secondary battery according to an embodiment of the present invention. A bipolar electrode 1 shown in FIG. 1 has a stacked structure in which a positive electrode active material layer 5 is formed on one surface of a current collector 3, and a negative electrode active material layer 7 is formed on the other surface of the current collector 3. The current collector 3 has a structure in which a first electrically conductive layer 3A located towards the positive electrode active material layer 5 and a second electrically conductive layer 3B located towards the negative electrode active material layer 7 are stacked on top of each other.

The first electrically conductive layer 3A has a constitution in which Ketjen black (registered trademark) is dispersed as electrically conductive filler in a substrate containing polyimide (PI). The second electrically conductive layer 3B includes two layers of an isolation resin layer 3a and a metal layer 3b. The isolation resin layer 3a has a constitution in which Ketjen black is dispersed as electrically conductive filler in a substrate containing resin not containing an imide group such as polypropylene (PP). The metal layer 3b contains copper.

The positive electrode active material layer 5 contains $LiNiO_2$ (not shown in the figure) as a positive electrode active material. The negative electrode active material layer 7 contains graphite (not shown in the figure) as a negative electrode active material. Hereinafter, main elements of the current collector 3 and the bipolar electrode 1 according to the present embodiment will be explained.

[Current collector] The current collector 3 serves as a medium for transferring electrons from one side on which the positive electrode active material layer is formed to the other side on which the negative electrode active material layer is formed.

(First electrically conductive layer) In the present embodiment, the current collector 3 includes the two electrically conductive layers 3A and 3B. The first electrically conductive layer 3A located towards the positive electrode active material layer 5 of the bipolar electrode 1, has a constitution in which electrically conductive filler is added to the substrate containing imide group-containing resin. This constitution contributes to not only functioning as an electron transmission medium but also reducing weight of the current collector.

The substrate included in the first electrically conductive layer 3A contains imide group-containing resin as an essential material. The imide group-containing resin has high heat resistance, strength and solvent resistance. Therefore, the use of the substrate containing the imide group-containing resin in the current collector contributes to ensuring deformation resistance against heat treatment or pressure treatment when manufacturing the battery and dissolution resistance against a solvent in an electrolysis solution.

Examples of the imide group-containing resin include polyimide (PI), polyamideimide (PAI), and polyetherimide (PEI). Among these, polyimide is preferably used as the imide group-containing resin. Specific examples of the polyimide include commercially-available polyimide having trade names such as UPILEX (registered trademark, manufactured by Ube Industries, Ltd.), KAPTON (registered trademark, manufactured by Du Pont-Toray Co., Ltd.), and APICAL (registered trademark, manufactured by Kaneka Corporation). Note that other examples of the polyimide may be used instead of the resins listed above. These examples of the imide group-containing resin may be used singly, or two or more thereof may be mixed together.

The substrate included in the first electrically conductive layer 3A may contain a conventionally-known non-electrically conductive polymer material or electrically conductive polymer material in addition to the imide group-containing resin. Examples of the non-electrically conductive polymer material include polyethylene (PE; high-density polyethylene (HDPE), low-density polyethylene (LDPE)), polypropylene (PP), polyethylene terephthalate (PET), polybutylene terephthalate (PBT), polyether nitrile (PEN), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVdF), and polystyrene (PS). Examples of the electrically conductive polymer material include polyaniline, polypyrrole, polythiophene, polyacetylene, polyparaphenylene, polyphenylene vinylene, polyacrylonitrile, and polyoxadiazole. These examples of the non-electrically conductive polymer material or the electrically conductive polymer material may be used singly, or two or more thereof may be mixed together.

The content of the imide group-containing resin of the polymer materials (resin) contained in the substrate of the first electrically conductive layer 3A is determined in view of further exertion of the effects of the present embodiment. In particular, the content of the imide group-containing resin (preferably, polyimide (PI)) with respect to 100% by mass of the resin in the substrate is preferably 50% by mass or higher. The content of the imide group-containing resin is more preferably 70% by mass, even more preferably 90% by mass, particularly preferably 95% by mass, most preferably 100% by mass.

The electrically conductive filler added in the substrate for composing the first electrically conductive layer 3A is not particularly limited as long as the electrically conductive filler has electric conductivity. Examples of the electrically conductive filler include electrically conductive carbon, tin (Sn), and lithium titanate ($Li_4Ti_5O_{12}$). The electrically conductive carbon preferably contains at least one kind selected from the group consisting of acetylene black, Vulcan, Black Pearls, carbon nanofiber, Ketjen black (registered trademark), carbon nanotube, carbon nanohorn, carbon nanoballoon, and fullerene. These types of the electrically conductive carbon have quite a wide potential window, are stable with respect to both positive electrode potential and negative electrode potential, and have high electric conductivity. Among these, the electrically conductive carbon more preferably contains at least one kind selected from the group consisting of carbon nanotube, carbon nanohorn, Ketjen black, carbon nanoballoon, and fullerene. Since these types of the electrically conductive carbon have a hollow structure and therefore have a large specific surface area per unit mass, a further reduction in weight of the current collector can be achieved. Alternatively, at least one metal material selected from the group consisting of nickel (Ni), aluminum (Al), copper (Cu), platinum (Pt), iron (Fe), chromium (Cr), zinc (Zn), indium (In), antimony (Sb), and potassium (K), or an alloy or a metal oxide containing these metals may be used as the electrically conductive filler. These metals have resistance to potential of a positive electrode or a negative electrode formed on the surfaces of the current collector. For example, Al has resistance to positive electrode potential, Ni and Cu have resistance to negative electrode potential, and Pt has resistance to potential of both electrodes. In particular, an alloy containing at least one metal selected from the group consisting of Ni, Al, Cu, Pt, Fe and Cr is more preferable. Specific examples of the alloy include stainless steel (SUS), Inconel (registered trademark), Hastelloy (registered trademark), a Fe—Cr alloy, and a Ni—Cr alloy. The use of these alloys can ensure higher resistance to potential. These alloys may be used singly, or two or more thereof may be mixed together.

The shape of the electrically conductive filler is not particularly limited, and a conventionally-known shape such as a granular shape, a fiber-like shape, a plate-like shape, a lump shape, a cloth shape, or a mesh-like shape may be selected appropriately. For example, when electric conductivity is desired to be exerted in a wide area of the resin, electrically conductive filler having a granular shape is preferably used. When further improvement of electric conductivity in a particular direction of the resin is desired, electrically conductive filler having a fiber-like shape and constant directionality is preferably used.

The size of the electrically conductive filler is not particularly limited, and filler having various sizes may be used depending on the size and the thickness of the electrically conductive layer or the shape of the electrically conductive filler. As an example, an average particle diameter in the case where the electrically conductive filler has a granular shape is preferably approximately in the range from 0.1 µm to 10 µm in view of ease of formation of the electrically conductive layer. Note that, in the description of the present invention, "the particle diameter" represents the greatest length L between any two points on the circumference of the electrically conductive filler. In addition, "the average particle diameter" represents a value calculated with a scanning electron microscope (SEM) or a transmission electron microscope (TEM) as an average value of particle diameters of the particles observed in several to several tens of fields of view. Particle diameters and average particle diameters of the active materials described below may be determined in the same manner.

The content of the electrically conductive filler in the first electrically conductive layer 3A is not particularly limited. However, the content of the electrically conductive filler is preferably in the range from 5% to 35% by mass, more preferably in the range from 5% to 25% by mass, even more preferably in the range from 5% to 15% by mass, with respect to the total mass of the substrate. When the electrically conductive filler having such a content is added to the substrate, an increase in mass of the first electrically conductive layer 3A can be suppressed and at the same time, the substrate can ensure sufficient electric conductivity.

The content of the polymer material of the substrate in the first electrically conductive layer 3A is preferably in the range from 65% to 95% by mass, more preferably in the range from 75% to 95% by mass, even more preferably in the range from 85% to 95% by mass. The polymer material having the content within such a range can contribute to a reduction in weight of not only the first electrically conductive layer 3A but also the entire current collector.

The dispersed state of the electrically conductive filler in the first electrically conductive layer 3A is not particularly limited. The electrically conductive filler may be dispersed uniformly in the resin of the substrate, or may be locally dispersed.

(Second electrically conductive layer) The second electrically conductive layer 3B located towards the negative electrode active material layer 7 of the bipolar electrode 1 includes the isolation resin layer 3a and the metal layer 3b, the isolation resin layer 3a having a constitution in which electrically conductive filler is added to a substrate containing resin not containing an imide group.

The substrate of the isolation resin layer 3a contains the resin not containing an imide group. In the present embodiment, the resin not containing an imide group contributes to suppressing permeation and absorption of lithium ions into the current collector 3 and improving resistance to negative electrode potential. In order to suppress permeation and absorption of the lithium ions inside the current collector 3, the isolation resin layer 3a is preferably stacked on the first electrically conductive layer 3A in a manner as to cover the entire surface of the first electrically conductive layer 3A on the negative electrode active material layer 7 side, as shown in FIG. 1. Here, the isolation resin layer 3a is preferably interposed at least between the negative electrode active material layer 7 and the first electrically conductive layer 3A.

The resin not containing an imide group is not particularly limited and may employ a non-cross-linked material or a cross-linked material. Specific examples of the resin not containing an imide group include polyethylene (PE), polypropylene (PP), polybutene-1 (PB), polyvinylidene chloride (PVDC), polyvinylidene fluoride (PVDF), polyoxymethylene (POM), polyamide-6 (PA-6), polyamide-66 (PA-66), polyethylene terephthalate (PET), polybutylene terephthalate (PBT), polyphenylene sulfide (PPS), polyetheretherketone (PEEK), an ethylene-tetrafluoroethylene copolymer (ETFE), a perfluoro-ethylene-propylene copolymer (FEP), perfluoro alkoxy alkane (PFA), rigid polyvinyl chloride (RPVC), polymethyl methacrylate (PMMA), general purpose polystyrene (GPPS), high impact polystyrene (HIPS), acrylonitrile-styrene copolymer resin (AS), acrylonitrile-butadiene-styrene copolymer resin (ABS), modified polyphenylene oxide (m-PPO), polycarbonate (PC), polysulfone (PSF), polyarylate (PAR), polyether sulfone (PES), and a cross-linked copolymer material in which part of the resin listed above is cross-linked. Other examples of the resin not containing an imide group include phenol resin, urea resin, melamine resin, epoxy resin, polyurethane, unsaturated polyester resin, ultraviolet curable silicone resin, urethane acrylate resin, epoxy acrylate resin, unsaturated acrylic resin, polyester acrylate resin, polyether acrylate resin, and polyene-polythiol resin. Among these types of the resin not containing an imide group, the cross-linked polymer material is preferably used in view of a further improvement in isolation of the lithium ions. These types of the resin not containing an imide group may be used singly, or two or more thereof may be mixed together.

The substrate of the isolation resin layer 3a may further contain the conventionally-known non-electrically conductive polymer material or electrically conductive polymer material described in the explanation of the first electrically conductive layer 3A, in addition to the resin not containing an imide group described above. The content of the resin not containing an imide group with respect to 100% by mass of the resin in the substrate of the isolation resin layer 3a, is preferably 50% by mass or higher. The content of the resin not containing an imide group is more preferably 70% by mass, even more preferably 90% by mass, particularly preferably 95% by mass, most preferably 100% by mass.

The isolation resin layer 3a may contain the imide group-containing resin to the extent of not impairing the effects of the present embodiment. However, the content of the imide group-containing resin in the isolation resin layer 3a is controlled in view of a further achievement of the effects of the present embodiment. In other words, the content of the imide group-containing resin in 100% by mass of the resin in the substrate is preferably 50% by mass or lower, more preferably 30% or lower, even more preferably 10% by mass, particularly preferably 5% by mass, most preferably 0% by mass. Namely, the isolation resin layer 3a most preferably contains no imide group-containing resin.

The isolation resin layer 3a has a configuration in which the electrically conductive filler is added to the substrate containing the resin described above. The specific material and constitution of the electrically conductive filler used for forming the isolation resin layer 3a are the same as those of the first electrically conductive layer, and specific explanations thereof are thus omitted here.

The content of the electrically conductive filler in the isolation resin layer 3a is not particularly limited. However, the content of the electrically conductive filler is preferably in the range from 5% to 35% by mass, more preferably in the range from 5% to 25% by mass, even more preferably in the range from 5% to 15% by mass, with respect to the total mass of the substrate. When the electrically conductive filler having the content within such a range is added to the substrate, an increase in mass of the isolation resin layer 3a can be suppressed and at the same time, the substrate can ensure sufficient electric conductivity.

The content of the polymer material of the substrate in the isolation resin layer 3a is preferably in the range from 65% to 95% by mass, more preferably in the range from 75% to 95% by mass, even more preferably in the range from 85% to 95% by mass. The polymer material having the content within such a range can contribute to a reduction in weight of not only the isolation resin layer 3a but also the entire current collector.

The second electrically conductive layer 3B is required to include the metal layer 3b. In the present embodiment, the metal layer 3b contributes to suppressing permeation and absorption of the lithium ions into the current collector 3 as in the case of the isolation resin layer 3a described above. Here, in order to suppress permeation and absorption of the lithium ions inside the current collector 3, the metal layer 3b is preferably stacked on the first electrically conductive layer 3A to cover the entire surface of the first electrically conductive layer 3A on the negative electrode active material layer 7 side, as in the case of the isolation resin layer 3a. Here, the metal layer 3b is preferably interposed at least between the negative electrode active material layer 7 and the first electrically conductive layer 3A.

The metal material used in the metal layer 3b according to the present embodiment is not particularly limited. Examples of the metal material include aluminum, copper, iron, chromium, nickel, titanium, vanadium, molybdenum, niobium, gold, silver, platinum, and an alloy, a metal carbide, a metal nitride or a metal oxide of these metals. Among these metal materials, a metal material having high electric conductivity is preferably used. In particular, one element selected from the group consisting of aluminum, nickel, copper, iron, titanium, and an alloy (for example, austenitic stainless steel such as SUS304, SUS316, SUS316L), a metal carbide, a metal nitride or a metal oxide is preferable. The alloy having high electric conductivity may be austenitic stainless steel such as SUS304, SUS316, SUS316L. The metal material used is preferably a metal material not dissolved under negative electrode potential at the time of discharging, or a metal material not alloyed with the lithium ions under negative electrode potential at the time of charging. Examples of such materials include copper, nickel, and an alloy of these metals, a metal phosphorus compound (such as nickel-phosphorus (NiP)), a metal boron compound (such as nickel-boron (NiB)), metal carbide, metal nitride (such as nickel nitride (NiN)), and a metal oxide.

The metal layer 3b may further contain other materials in addition to the metal material described above. However, in order to suppress permeation and absorption of the lithium ion and further ensure electric conductivity, the content of the metal material in the metal layer 3b is preferably 80% by mass or greater, more preferably 90% by mass or greater, most preferably 100% by mass or greater.

Figure 2:
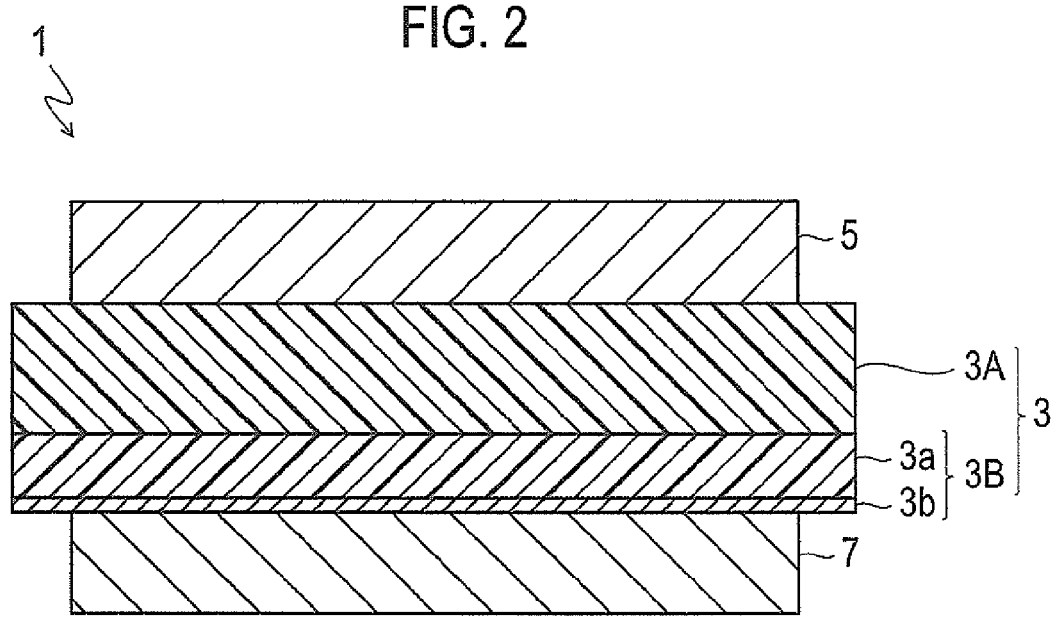
FIG. 2 is a cross-sectional view schematically showing the entire structure of an electrode for a bipolar lithium ion secondary battery using a current collector for a bipolar lithium ion secondary battery according to another embodiment of the present invention.

The current collector 3 is required to include the first electrically conductive layer 3A and the second electrically conductive layer 3B which includes at least the isolation resin layer 3a and the metal layer 3b. The first electrically conductive layer 3A is located towards the positive electrode active material layer, and the second electrically conductive layer 3B is located towards the negative electrode active material layer. This relative position allows the respective layers to have any stacked configurations or to include other additional layers; however, any case is included in the scope of the present invention. As an example, FIG. 2 is a cross-sectional view schematically showing the entire structure of the electrode for a bipolar lithium ion secondary battery using a current collector for a bipolar lithium ion secondary battery according to another embodiment of the present invention. The configuration of FIG. 2 differs from that of FIG. 1 in that the isolation resin layer 3a in the second electrically conductive layer 3B is located in a manner such that the positive electrode active material layer is closer thereto than the metal layer 3b. However, the configuration shown in FIG. 2 can also achieve the same effect as the configuration shown in FIG. 1. Namely, the current collector 3 according to the present embodiment can ensure sufficient lithium ion isolation performance regardless of the positional relationship between the isolation resin layer 3a and the metal layer 3b in the second electrically conductive layer 3B.

Figure 3:
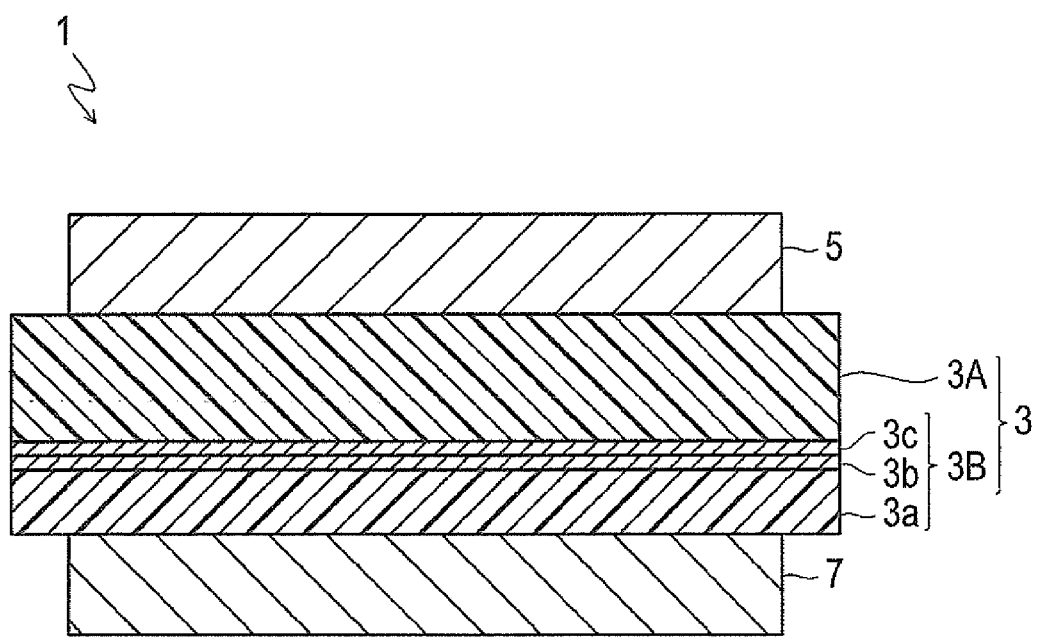
FIG. 3 is a cross-sectional view schematically showing the entire structure of an electrode for a bipolar lithium ion secondary battery using a current collector for a bipolar lithium ion secondary battery including a metal elution-preventing layer according to still another embodiment of the present invention.

The current collector according to the present embodiment may also be a stacked body further including another layer as necessary in addition to the layers described above. An example of the other layer may be a metal elution-preventing layer or an adhesion layer, but is not limited thereto. FIG. 3 is a cross-sectional view schematically showing the entire structure of the electrode for a bipolar lithium ion secondary battery using a current collector for a bipolar lithium ion secondary battery including a metal elution-preventing layer according to still another embodiment of the present invention. In the configuration shown in FIG. 3, the second electrically conductive layer 3B includes a metal elution-preventing layer 3c containing, for example, chromium provided on the surface of the metal layer 3b containing, for example, copper so as to face the first electrically conductive layer 3A (on the surface of the metal layer 3b on the positive electrode active material layer 5 side). The metal elution-preventing layer 3c functions to prevent elution of the metal layer 3b because of electromigration or ion migration caused when the first electrically conductive layer 3A containing an imide group which is a polar group comes into contact with the metal layer 3b.

The metal material used for the metal elution-preventing layer 3c is not particularly limited. Examples of the metal material include chromium, nickel, cobalt, iron, palladium, platinum, an alloy thereof (for example, a nickel-chromium alloy), and a metal carbide, a metal nitride or a metal oxide of these metals. In particular, the metal elution-preventing layer 3c containing the metal material listed above contributes to effectively preventing metal elution in the case where the metal layer 3b contains copper or aluminum.

The metal elution-preventing layer 3c may further contain other materials in addition to the metal material described above. However, in order to prevent elution of the metal layer 3b, the content of the metal material described above in the metal elution-preventing layer 3c is preferably 80% by mass or greater, more preferably 90% by mass or greater, most preferably 100% by mass or greater. Further, in order to prevent elution of the metal layer 3b due to electromigration or the like, the metal elution-preventing layer 3c is preferably stacked on the first electrically conductive layer 3A in a manner as to cover the entire surface of the first electrically conductive layer 3A on the negative electrode active material layer 7 side.

The current collector 3 according to the present embodiment may be manufactured in a manner such that the respective layers are sequentially stacked on one layer, or in a manner such that two layers are separately prepared and then attached to each other. The method of the attachment of the respective layers is not particularly limited. For example, when two layers each containing resin are attached to each other, these layers may be attached by thermal fusion. When the layer containing resin is attached to the metal layer 3b or the metal elution-preventing layer 3c, the attachment method may be metal vapor deposition (plating, sputtering) on the layer containing resin, or resin fusion on metal leaf. Furthermore, in order to decrease contact resistance on the interface between the adjacent layers and prevent separation of the attached surfaces, the two layers may be attached to each other via an adhesion layer. Preferable examples of the material used for such an adhesion layer include metal oxide-based electrically conductive paste containing zinc oxide, indium oxide, titanium oxide or the like; and carbon-based electrically conductive paste containing carbon black, carbon nanotube, graphite or the like.

The thickness of the current collector is preferably reduced as much as possible so as to increase output density of the battery by decreasing weight. In the bipolar secondary battery, a reduction in thickness is possible since the current collector present between the positive electrode active material layer and the negative electrode active material layer in the bipolar battery is not required to have low electrical resistance in the direction perpendicular to the stacking direction. In particular, the lower limit of the thickness of the current collector 3 is preferably 10 μm or greater, more preferably 20 μm or greater, even more preferably 25 μm or greater. The upper limit of the thickness of the current collector 3 is preferably 200 μm or lower, more preferably 100 μm or lower, even more preferably 50 μm or lower. The current collector having such a thickness can achieve a reduction in weight and ensure sufficient mechanical strength.

The thickness of each of the first electrically conductive layer 3A and the second electrically conductive layer 3B is not particularly limited. In particular, however, the lower limit of the thickness of each of the first electrically conductive layer 3A and the second electrically conductive layer 3B is preferably 5 μm or greater, more preferably 7 μm or greater, even more preferably 10 μm or greater. The upper limit of the thickness of each of the first electrically conductive layer 3A and the second electrically conductive layer 3B is preferably 100 μm or lower, more preferably 50 μm or lower, even more preferably 25 μm or lower.

The thickness ratio of the first electrically conductive layer 3A to the second electrically conductive layer 3B is not particularly limited, but the ratio (the first electrically conductive layer 3A/the second electrically conductive layer 3B) is preferably in the range from 1000/1 to 1/1000, more preferably in the range from 100/1 to 1/100, even more preferably in the range from 5/1 to 1/15, particularly preferably in the range from 2/1 to 1/5, most preferably in the range from 1/1 to 1/4. The ratio within such a range can contribute to sufficiently ensuring isolation performance to isolate lithium ions or an electrolyte and improving a battery capacity. In particular, when the second electrically conductive layer 3B is thicker than the first electrically conductive layer 3A, the isolation performance to isolate the lithium ions is more significantly achieved so as to effectively prevent a reduction of the battery capacity.

The thickness of the metal layer 3b or the metal elution-preventing layer 3c provided as necessary in the second electrically conductive layer 3B is not particularly limited. However, in view of a reduction in weight of the current collector or a reduction in resistance in the plane direction of the current collector to prevent concentration of a current on a portion on which a short circuit is caused, the thickness is preferably reduced as much as possible. Particularly, the metal layer 3b or the metal elution-preventing layer 3c is preferably thinner than the first electrically conductive layer 3A. The thickness ratio of the first electrically conductive layer 3A to the metal layer 3b (the first electrically conductive layer 3A/the metal layer 3b) is preferably 10/1 or lower. In particular, the thickness of the metal layer 3b or the metal elution-preventing layer 3c is preferably in the range from 0.001 μm to 1 μm, more preferably in the range from 0.01 μm to 0.1 μm, even more preferably in the range from 0.05 μm to 0.1 μm.

The upper limit of the volume resistance of the current collector 3 is preferably $10^2$ Ω·cm or lower, more preferably 10 Ω·cm or lower, in view of battery performance. The lower limit of the volume resistance of the current collector 3 is preferably $10^{-5}$ Ω·cm or greater, more preferably $5\times10^{-2}$ Ω·cm or greater, even more preferably $10^{-1}$ Ω·cm or greater, in view of the prevention of concentration of a current on a portion on which a short circuit is caused. In order to set the volume resistance within such a range, the type, amount and dispersed state of the electrically conductive filler added to the substrate (resin) at the time of preparing the electrically conductive layer, and the metal material used for the metal layer or the metal elution-preventing layer, may be adjusted as appropriate.

Hereinafter, the effects achieved by the current collector 3 according to the present embodiment will be explained. In general, an energy level of a highest occupied molecular orbital (HOMO) of an electrically conductive layer located towards a negative electrode active material layer of a bipolar battery, increases because of electron supply based on negative electrode potential. The inventors of the present invention found out that electrons move when the increased level exceeds oxidation-reduction potential of lithium ions in an electrolysis solution, and the lithium ions permeate the inside of a resin current collector in association with the movement of the electrons.

In the current collector 3 according to the present invention, even when the energy level of the highest occupied molecular orbital of the isolation resin layer 3a included in the second electrically conductive layer 3B increases due to the negative electrode potential, the increased level is prevented from exceeding the oxidation-reduction potential of the lithium ions in the electrolysis solution. As a result, permeation and absorption of the lithium ions into the resin current collector are prevented. In addition, the metal layer 3b included in the second electrically conductive layer 3B functions to improve the isolation performance to isolate the lithium ions. Accordingly, the resin current collector containing imide group-containing resin can ensure the sufficient isolation performance to isolate the lithium ions due to the use of both the isolation resin layer 3a and the metal layer 3b in the second electrically conductive layer 3B.

In addition, the current collector 3 according to the present embodiment can suppress resistance in the plane direction due to the metal layer 3b in addition to the isolation resin layer 3a provided in the second electrically conductive layer 3B to function to isolate the lithium ions. Accordingly, even when the battery causes a short circuit in the inside thereof, the current hardly flows to the short-circuit portion so as to prevent heat generation in the battery. Further, the current collector 3 according to the present embodiment has high resistance to negative electrode potential by providing both the metal layer 3b and the isolation resin layer 3a.

[Positive electrode active material layer] The positive electrode active material layer 5 contains a positive electrode active material. The positive electrode active material has a constitution to absorb ions when discharging and release the ions when charging. As a preferable example, a lithium-transition metal composite oxide may be used, which is a composite oxide of transition metal and lithium. Specific examples of the material used include a Li/Co composite oxide such as $LiCoO_2$, a Li/Ni composite oxide such as $LiNiO_2$, a Li/Mn composite oxide such as $LiMn_2O_4$, a Li/Fe composite oxide such as $LiFeO_2$, and an oxide in which part of each of these transition metals is substituted with other elements. Such a lithium-transition metal composite oxide is a low-cost material having high reactivity and cycle characteristics. Due to the electrode using such a material, a battery with high output performance can be provided. Other examples of the positive electrode active material include a phosphate compound including transition metal and lithium such as $LiFePO_4$ and a sulfate compound ; a transition metal oxide and sulfide such as $V_2O_5$, $MnO_2$, $TiS_2$, $MoS_2$ and $MoO_3$; and $PbO_2$, AgO and NiOOH. The positive electrode active materials listed above may be used singly, or two or more thereof may be mixed together.

An average particle diameter of the positive electrode active material is not particularly limited, but is preferably in the range from 1 µm to 100 µm, more preferably in the range from 1 µm to 20 µm, in view of higher capacity, reactivity and cycle durability of the positive electrode active material. When the average particle diameter is within such a range, the secondary battery can prevent an increase in internal resistance when charging and discharging under high output conditions so as to extract a sufficient current. When the positive electrode active material includes secondary particles, an average particle diameter of primary particles included in the secondary particles is preferably in the range from 10 nm to 1 µm; however, the average particle diameter is not necessarily limited to this range in the present invention. The positive electrode active material is not required to be in the state of the secondary particles obtained by aggregation or clusterization, although it depends on the production method. The particle diameter of each of the positive electrode active material layer and the primary particles may employ a median diameter obtained by use of laser diffraction.

The shape of the positive electrode active material varies depending on the type or the production method, and examples thereof include a spherical shape (a powder state), a plate-like shape, a needle-like shape, a column-like shape, and a rectangular shape. However, the shape is not limited to these and may employ any shape without any particular obstacle. Preferably, a shape capable of properly improving battery performance such as charge and discharge performance is selected as appropriate.

[Negative electrode active material layer] The negative electrode active material layer 7 contains a negative electrode active material. The negative electrode active material has a constitution to release ions when discharging and absorb ions when charging. The negative electrode active material is not particularly limited as long as it can reversely absorb and release lithium. Preferable examples of the negative electrode active material include metal such as Si and Sn, a metal oxide such as TiO, $Ti_2O_3$ and $TiO_2$ or $SiO_2$, SiO and $SnO_2$, a composite oxide of lithium and transition metal such as $Li_{4/3}Ti_{5/3}O_4$ or $Li_7MnN$, a Li—Pb alloy, a Li—Al alloy, Li, and a carbon material such as graphite (natural graphite, artificial graphite), carbon black, activated carbon, carbon fiber, coke, soft carbon or hard carbon. The negative electrode active materials listed above may be used singly, or two or more thereof may be mixed together.

The negative electrode active material preferably contains an element to be alloyed with lithium. By using the element to be alloyed with lithium, a battery having high energy density, high capacity and output performance can be provided, compared with a case of using conventional carbon materials. Specific examples of the element to be alloyed with lithium include, but are not limited to, Si, Ge, Sn, Pb, Al, In, Zn, H, Ca, Sr, Ba, Ru, Rh, Ir, Pd, Pt, Ag, Au, Cd, Hg, Ga, Tl, C, N, Sb, Bi, 0, S, Se, Te, and Cl.

Among these elements, the negative electrode active material preferably contains the carbon material and/or at least one element selected from the group consisting of Si, Ge, Sn, Pb, Al, In, and Zn, in order to obtain a battery having high capacity and energy density. Particularly, the negative electrode active material layer preferably contains the carbon material, or the element of Si or Sn.

An average particle diameter of the negative electrode active material is not particularly limited, but is preferably in the range from 1 µm to 100 µm, more preferably in the range from 1 µm to 20 µm, in view of higher capacity, reactivity and cycle durability of the negative electrode active material. When the average particle diameter is within such a range, the secondary battery can prevent an increase in internal resistance when charging and discharging under high output conditions so as to extract a sufficient current. When the negative electrode active material includes secondary particles, an average particle diameter of primary particles included in the secondary particles is preferably in the range from 10 nm to 1 µm; however, the average particle diameter is not necessarily limited to this range in the present invention. The negative electrode active material is not required to be in the state of the secondary particles obtained by aggregation or clusterization, although it depends on the production method. The particle diameter of each of the negative electrode active material layer and the primary particles may employ a median diameter obtained by use of laser diffraction.

The shape of the negative electrode active material varies depending on the type or the production method, and examples thereof include a spherical shape (a powder state), a plate-like shape, a needle-like shape, a column-like shape, and a rectangular shape. However, the shape is not limited to these and may employ any shape without any particular obstacle. Preferably, a shape capable of properly improving battery performance such as charge and discharge performance is selected as appropriate.

The positive electrode active material layer 5 and the negative electrode active material layer 7 may contain other substances if necessary. For example, an electric conducting additive, a binder and the like may be contained. When an ion conducting polymer is contained, a polymerization initiator for polymerizing the polymer may be contained.

The electric conducting additive is an additive added in order to improve electric conductivity in the active material layers. Examples of the electric conducting additive include carbon powder such as acetylene black, carbon black, Ketjen black, and graphite, various types of carbon fiber such as vapor-phase growth carbon fiber (VGCF), and expanded graphite. However, the electric conducting additive is not limited to these examples.

Examples of the binder include polyvinylidene fluoride (PVDF), PI, PTFE, SBR, and synthetic rubber; however, the binder is not limited to these examples. When the binder is identical to a matrix polymer used as a gel electrolyte, the binder is not necessarily used.

A mixing ratio of the components contained in the respective active material layers is not particularly limited. The mixing ratio may be adjusted by appropriately referring to the known findings on lithium ion secondary batteries. The thickness of the respective active material layers is not particularly limited, and the known findings on lithium ion secondary batteries may be appropriately referred to. As an example, the thickness of the respective active material layers is preferably approximately in the range from 10 µm to 100 µm, more preferably in the range from 20 µm to 50 µm. The respective active material layers having a thickness of approximately 10 µm or greater can ensure a sufficient battery capacity. The respective active material layers having a thickness of approximately 100 µm or lower can prevent an increase in internal resistance caused in association with a state where the lithium ions are hardly dispersed deep inside the electrode (on the current collector side).

The method of forming the positive electrode active material layer (or the negative electrode active material layer) on the surface of the current collector is not particularly limited, and may use conventionally-known methods. For example, as described above, the positive electrode active material, and if necessary, electrolyte salts for improving ion conductivity, an electric conducting additive for improving electron conductivity and a binder are dispersed and dissolved in an appropriate solvent so as to prepare positive electrode active material slurry. Similarly, the negative electrode active material, and if necessary, electrolyte salts, an electric conducting additive and a binder are dispersed and dissolved in an appropriate solvent so as to prepare negative electrode active material slurry. Subsequently, the positive electrode active material slurry is applied to the current collector, dried to remove the solvent and pressed so as to form the positive electrode active material layer on the current collector. Similarly, the negative electrode active material slurry is applied to the current collector, dried to remove the solvent and pressed so as to form the negative electrode active material layer on the current collector.

The solvent used is not particularly limited, but may be N-methyl-2-pyrrolidone (NMP), dimethylformamide, dimethylacetamide, methylformamide, cyclohexane, hexane, or water. When polyvinylidene fluoride (PVdF) is used as a binder, NMP may be preferably used as the solvent.

In the method described above, the positive electrode active material slurry (or the negative electrode active material slurry) is applied to the current corrector, and dried and pressed. In this case, the adjustment for pressing conditions controls porosity of the positive electrode active material layer and the negative electrode active material layer.

Specific pressing means and pressing conditions are not particularly limited, and may be determined as appropriate so as to achieve desired porosity of the positive electrode active material layer and the negative electrode active material layer after press processing. For example, specific pressing means may be a hot pressing machine or a calendar roll press machine. The pressing conditions (such as temperature and pressure) are not particularly limited, and the known findings may be appropriately referred to.

According to the bipolar electrode 1 of the present embodiment, even when the energy level of the highest occupied molecular orbital (HOMO) of the isolation resin layer 3a included in the second electrically conductive layer 3B increases due to the negative electrode potential, the increased level is prevented from exceeding the oxidation-reduction potential of the lithium ions in the electrolysis solution. As a result, permeation and absorption of the lithium ions into the resin current collector are prevented. In addition, the metal layer 3b included in the second electrically conductive layer 3B functions to improve the isolation performance to isolate the lithium ions. Accordingly, the resin current collector containing imide group-containing resin can sufficiently ensure the isolation performance to isolate the lithium ions due to the use of both the isolation resin layer 3a and the metal layer 3b in the second electrically conductive layer 3B.

Figure 4:
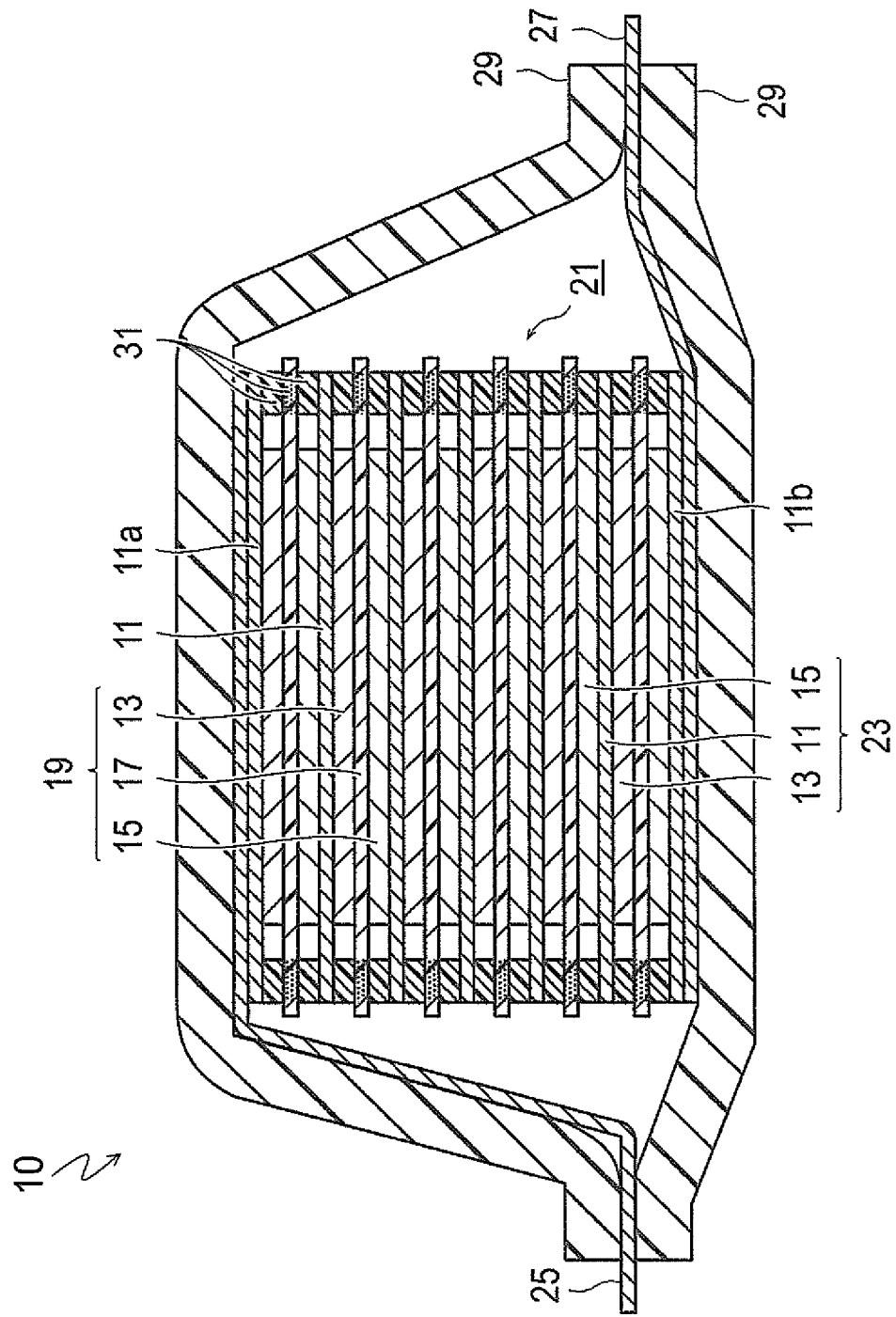
FIG. 4 is a cross-sectional view schematically showing a bipolar lithium ion secondary battery according to an embodiment of the present invention.

<Bipolar secondary battery> A bipolar lithium ion secondary battery according to the present invention includes a power generation element in which the bipolar electrode 1 described above and an electrolyte layer are stacked on top of each other. FIG. 4 is a cross-sectional view schematically showing the entire structure of the bipolar secondary battery according to an embodiment of the present invention. A bipolar secondary battery 10 shown in FIG. 4 has a structure in which a substantially rectangular power generation element 21, in which a charge-discharge reaction actually progresses, is sealed inside a laminated film 29 serving as a battery exterior member.

As shown in FIG. 4, the power generation element 21 of the bipolar secondary battery 10 according to the present embodiment includes plural bipolar electrodes 23 (the bipolar electrode 1 shown in FIG. 1 to FIG. 3). The bipolar electrodes 23 each include a positive electrode active material layer 13 electrically connected to one surface of a current collector 11 (the current collector 3 shown in FIG. 1 to FIG. 3) and a negative electrode active material layer 15 electrically connected to the other surface of the current collector 11. The respective bipolar electrodes 23 are stacked on top of each other via electrolyte layers 17 to form the power generation element 21. The electrolyte layers 17 each have a configuration in which an electrolyte is held in the middle portion in the plane direction of a separator serving as a substrate. The bipolar electrodes 23 and the electrolyte layers 17 are alternately stacked in a manner such that the positive electrode active material layer 13 of one bipolar electrode 23 faces the negative electrode active material layer 15 of another bipolar electrode 23 adjacent to the one bipolar electrode 23 via the electrolyte layer 17. Namely, the electrolyte layer 17 is interposed between the positive electrode active material layer 13 of one bipolar electrode 23 and the negative electrode active material layer 15 of another bipolar electrode 23 adjacent to the one bipolar electrode 23.

The positive electrode active material layer 13, the electrolyte layer 17 and the negative electrode active material layer 15 adjacent to each other constitute a single cell layer 19. The bipolar secondary battery 10 thus has a configuration in which the plural single cell layers 19 are stacked on top of each other. In order to prevent liquid junction caused by leakage of the electrolysis solution from the electrolyte layer 17, a sealing member (an insulation layer) 31 is provided on the periphery of each of the single cell layers 19. Here, only one surface of the outermost current collector 11a on the positive electrode side located on the outermost layer of the power generation element 21, is provided with the positive electrode active material layer 13. Similarly, only one surface of the outermost current collector 11b on the negative electrode side located on the outermost layer of the power generation element 21, is provided with the negative electrode active material layer 15.

The bipolar secondary battery 10 shown in FIG. 4 includes a positive electrode current collecting plate 25 placed adjacent to the outermost current collector 11a on the positive electrode side and extending to be exposed on the outside of the laminated film 29. The bipolar secondary battery 10 further includes a negative electrode current collecting plate 27 placed adjacent to the outermost current collector 11b on the negative electrode side and extending to be exposed on the outside of the laminated film 29.

In the bipolar secondary battery 10 shown in FIG. 4, the sealing member 31 is normally provided on the periphery of each of the single cell layers 19. The sealing member 31 is provided in order to prevent contact between the current collectors 11 adjacent to each other inside the battery and prevent a short circuit caused by slight unevenness at edge portions of the single cell layers 19 in the power generation element 21. The provision of the sealing member 31 ensures reliability and safety for a long period of time, which provides the bipolar secondary battery 10 with high quality.

The number of the single cell layers 19 stacked is determined depending on desired voltage. The number of the single cell layers 19 stacked in the bipolar secondary battery 10 may be minimized to decrease the thickness of the battery to the extent that sufficient output can be ensured. In order to prevent external damage at the time of operation and avoid environmental worsening, the bipolar secondary battery 10 preferably has a structure in which the power generation element 21 is sealed in the laminated film 29 under reduced pressure, and the positive electrode current collecting plate 25 and the negative electrode current collecting plate 27 are exposed on the outside of the laminated film 29. Hereinafter, main elements of the bipolar secondary battery according to the present embodiment will be explained.

[Electrolyte layer] The electrolyte contained in the electrolyte layer is not particularly limited, and a liquid electrolyte or a polymer electrolyte such as a polymer gel electrolyte and a polymer solid electrolyte may be used as appropriate.

The liquid electrolyte has a constitution in which lithium salts which are supporting salts are dissolved in an organic solvent. Examples of the solvent used include dimethyl carbonate (DMC), diethyl carbonate (DEC), dipropyl carbonate (DPC), ethyl methyl carbonate (EMC), methyl propionate (MP), methyl acetate (MA), methyl formate (MF), 4-methyl-dioxolan (4MeDOL), dioxolan (DOL), 2-methyl-tetrahydrofuran (2MeTHF), tetrahydrofuran (THF), dimethoxyethane (DME), ethylene carbonate (EC), propylene carbonate (PC), butylene carbonate (BC), and y-butyrolactone (GBL). These solvents may be used singly, or two or more thereof may be mixed together.

Examples of the supporting salts (the lithium salts) include inorganic acid anionic salts such as $LiPF_6$, $LiBF_4$, $LiClO_4$, $LiAsF_6$, $LiTaF_6$, $LiSbF_6$, $LiAlCl_4$, $Li_2B_{10}Cl_{10}$, LiI, LiBr, LiCl, LiAlCl, $LiHF_2$ and LiSCN, and organic acid anionic salts such as $LiCF_3SO_3$, $Li(CF_3SO_2)_2N$, LiBOB (lithium bis(oxalate)borate), LiBETI (lithium bis(perfluoroethanesulfonyl)imide); and $Li(C_2F_5SO_2)_2N$. These electrolyte salts may be used singly, or two or more thereof may be mixed together.

The polymer electrolyte is divided into a gel electrolyte containing an electrolysis solution and a solid polymer electrolyte not containing an electrolysis solution. The gel electrolyte has a constitution in which the liquid electrolyte is poured into a matrix polymer having lithium ion conductivity. Examples of the matrix polymer having lithium ion conductivity include a polymer containing polyethylene oxide in a main chain or a side chain thereof (PEO), a polymer containing polypropylene oxide in a main chain or a side chain thereof (PPO), polyethylene glycol (PEG), polyacrylonitrile (PAN), polymethacrylic acid ester, polyvinylidene fluoride (PVdF), a polyvinylidene fluoride-hexafluoropropylene copolymer (PVdF-HFP), polymethyl acrylate (PMA), and polymethyl methacrylate (PMMA). Alternatively, a mixture form, a modified form, a derivative form, a random copolymer, an alternate copolymer, a graft copolymer, and a block copolymer of these polymers listed above may also be used. Among these, PEO, PPO, a copolymer of these polymers, PVdF, or PVdF-HFP is preferably used. The electrolyte salts such as lithium salts are easily dissolved in these types of matrix polymers.

When the electrolyte layer contains the liquid electrolyte or the gel electrolyte, a separator may be used in the electrolyte layer. A specific example of the separator may be a microporous film containing hydrocarbon such as polyolefin (such as polyethylene and polypropylene) and polyvinylidene fluoride-hexafluoropropylene (PVdF-HFP) or glass fibers.

The solid polymer electrolyte has a constitution in which the supporting salts (the lithium salts) are dissolved in the matrix polymer described above, but no organic solvent serving as a plasticizer is contained. Therefore, liquid leakage from the battery is prevented when the electrolyte layer contains the solid polymer electrolyte and accordingly, the reliability of the battery is increased.

The matrix polymer of the polymer gel electrolyte and the solid polymer electrolyte can exhibit high mechanical strength when a cross-linked structure is formed. The cross-linked structure may be formed in a manner such that a polymerizable polymer used for polymer electrolyte formation (for example, PEO and PPO) is subjected to polymerization treatment by use of an appropriate polymerization initiator. Examples of the polymerization treatment include thermal polymerization, ultraviolet polymerization, radiation polymerization, and electron beam polymerization. The electrolyte may be contained in the active material layers of the electrode.

[Sealing member] The sealing member (the insulation layer) functions to prevent contact between the current collectors adjacent to each other and prevent a short circuit caused at the edge portions of the single cell layers. The material contained in the sealing member may be any material as long as the material has an insulation property, a sealing property to prevent the electrolyte from coming off and prevent permeation of external moisture, heat resistance under battery operation temperature and the like. Examples of the material include acrylic resin, urethane resin, epoxy resin, polyethylene resin, polypropylene resin, polyimide resin, and rubber (ethylene-propylene-diene rubber; EPDM). Alternatively, an isocyanate adhesive, an acrylic resin adhesive, a cyanoacrylate adhesive, or a hot-melt adhesive (urethane resin, polyamide resin, polyolefin resin) may also be used. Among these, polyethylene resin or polypropylene resin is preferably used as a constituent material of the insulation layer in view of corrosion resistance, chemical resistance, ease of production (film-forming performance), and economical efficiency. In addition, resin containing amorphous polypropylene resin as a main component and obtained by copolymerizing ethylene, propylene and butene, is preferably used as the constituent material of the insulation layer.

[Battery exterior member] The battery exterior member may employ a conventionally-known metal can casing. The battery exterior member is a bag-shaped casing using a laminated film containing aluminum and capable of covering the power generation element. The laminated film may be, but is not limited to, a laminated film having a three-layer structure obtained by stacking polypropylene, aluminum and nylon in this order. In the present embodiment, a laminated film having high output performance and cooling performance suitable for use in batteries for large apparatuses such as EV and HEV, is preferable.

According to the bipolar secondary battery 10 of the present embodiment, even when the energy level of the highest occupied molecular orbital of the isolation resin layer 3a included in the second electrically conductive layer 3B increases due to the negative electrode potential, the increased level is prevented from exceeding the oxidation-reduction potential of the lithium ions in the electrolysis solution. As a result, permeation and absorption of the lithium ions into the resin current collector are prevented. In addition, the metal layer 3b included in the second electrically conductive layer 3B functions to improve the isolation performance to isolate the lithium ions. Accordingly, the permeation and absorption of the lithium ions into the resin current collector can be sufficiently prevented so as to suppress a decrease in battery capacity.

EXAMPLES

Hereinafter, the effects of the present invention will be explained with reference to the following examples and comparative examples; however, the scope of the present invention is not limited only to the examples.

Example 1

<Preparation of Current collector> As a first electrically conductive layer, an electrically conductive resin film (film thickness: 50 μm) was prepared in which 10 parts by mass of Ketjen black was mixed in 100 parts by mass of polyimide (PI). On one surface of the first electrically conductive layer, copper was deposited by sputtering in a manner such that the thickness of the copper was set to 20 nm, thereby forming a stacked body of the first electrically conductive layer and the metal layer.

Next, an electrically conductive resin film (film thickness: 100 μm) was prepared in which 10 parts by mass of Ketjen black was mixed in 100 parts by mass of polypropylene (PP), thereby forming an isolation resin layer.

Subsequently, the isolation resin layer was stacked on the surface on the metal layer side of the stacked body of the first electrically conductive layer and the metal layer, and these were thermally fused together at 160° C. for 10 minutes. Accordingly, a current collector for a bipolar lithium ion secondary battery having a three-layer structure as shown in FIG. 1 was prepared.

<Preparation of Bipolar electrode> First, 90 parts by mass of graphite as a negative electrode active material, 10 parts by mass of PVDF as a binder, and an appropriate amount of NMP as a slurry viscosity adjustment solvent were mixed so as to prepare negative electrode active material slurry. Next, 85 parts by mass of $LiNiO_2$ as a positive electrode active material, 5 parts by mass of acetylene black as an electric conducting additive, 10 parts by mass of polyvinylidene fluoride as a binder, and an appropriate amount of N-methyl-2-pyrrolidone as a slurry viscosity adjustment solvent were mixed so as to prepare positive electrode active material slurry.

The negative electrode active material slurry was applied to the surface of the current collector on the second electrically conductive layer side, namely, to the surface of the isolation resin layer, and then dried to form a negative electrode active material layer. The thickness of the negative electrode active material layer was set to 30 μm. Similarly, the positive electrode active material slurry was applied to the surface of the current collector on the first electrically conductive layer side, and then dried to form a positive electrode active material layer. The thickness of the positive electrode active material layer was set to 30 μm. In this case, each of the negative electrode active material layer and the positive electrode active material layer was prepared in a manner such that the negative electrode active material layer had the same area as the positive electrode active material layer, and the projected figure of each of the negative electrode active material layer and the positive electrode active material layer projected on the current collector was adjusted to correspond to each other. Thereafter, 20 mm of each of the negative electrode active material layer and the positive electrode active material layer was peeled from the periphery of the current collector to expose the surface of the current collector to the outside, thereby finishing a bipolar electrode.

<Preparation of Bipolar secondary battery> First, $LiPF_6$ as lithium salts was dissolved, at a concentration of 1 mol/L, in a solvent in which propylene carbonate and ethylene carbonate having the same volume were mixed, so as to prepare an electrolysis solution.

A sealing member having a width of 12 mm was placed on the exposed part (on the periphery) of the surface of the current collector on the first electrically conductive layer side. This operation was repeated to prepare a stacked body in which six bipolar electrodes were stacked on top of each other via electrolyte layers. Next, the stacked body thus obtained was subjected to hot-press treatment in the stacked direction to fuse the sealing members so that the bipolar electrodes adjacent to each other were sealed up, thereby finishing a power generation element. As for the hot-press treatment, the entire surface of the stacked body was pressed at 0.2 MPa, at 80° C. for 5 seconds.

Thereafter, the power generation element thus obtained was held between two current collecting plates containing aluminum and capable of covering the entire power generation element. The current collecting plates and the power generation element were covered with a laminated film containing aluminum, and three sides thereof were fused to be formed in a bag shape. The electrolysis solution was poured therein from the other remaining side, and this side was then fused under vacuum. The laminated power generation element and current collecting plates were subjected to hot-press treatment in the stacked direction, and the uncured sealing members were cured, so as to complete a bipolar secondary battery. As for the hot-press treatment, the entire laminated film was pressed at contact pressure of 1 kg/cm$^2$, at 150° C. for one hour.

Example 2

In the preparation of the current collector, copper was deposited on one surface of the first electrically conductive layer by sputtering in a manner such that the thickness of the copper was set to 20 nm. The deposited copper was intensely heated at 150° C. to obtain copper oxide, thereby forming a stacked body of the first electrically conductive layer and the metal layer. Namely, the current collector in which the metal layer contained copper oxide was prepared. Similar operations to those of Example 1 other than the preparation of the current collector were repeated, so as to manufacture a bipolar secondary battery.

Example 3

On one surface of the first electrically conductive layer, chromium was deposited by sputtering in a manner such that the thickness of the chromium was set to 50 nm, thereby forming a metal elution-preventing layer. Next, copper was further deposited thereon in the same manner in a manner such that the thickness of the copper was set to 20 nm, thereby forming a stacked body of the first electrically conductive layer, the metal elution-preventing layer and the metal layer. Subsequently, the isolation resin layer was stacked on the surface on the metal layer side of the stacked body of the first electrically conductive layer and the metal layer, and these were thermally fused together at 160° C. for 10 minutes, thereby preparing a current collector for a bipolar lithium ion secondary battery. Namely, the current collector having the metal elution-preventing layer on the surface of the metal layer opposed to the first electrically conductive layer, was prepared. Similar operations to those of Example 1 other than the preparation of the current collector were repeated, so as to manufacture a bipolar secondary battery.

Comparative Example 1

On one surface of the first electrically conductive layer, copper was deposited by sputtering in a manner such that the thickness of the copper was set to 20 nm, and the stacked body of the first electrically conductive layer and the metal layer thus obtained was used as a current collector for a bipolar lithium ion secondary battery. Namely, the current collector not including the isolation resin layer was prepared. Similar operations to those of Example 1 other than the preparation of the current collector were repeated, so as to manufacture a bipolar secondary battery.

Comparative Example 2

The first electrically conductive layer was stacked on the isolation resin layer, and these were thermally fused together at 160° C. for 10 minutes, thereby preparing a current collector for a bipolar lithium ion secondary battery. Namely, the current collector not including the metal layer was prepared. Similar operations to those of Example 1 other than the preparation of the current collector were repeated, so as to manufacture a bipolar secondary battery.

Comparative Example 3

As for the current collector for a bipolar lithium ion secondary battery, an electrically conductive resin film was used in which 10 parts by mass of Ketjen black was mixed in 100 parts by mass of polyimide (PI). Namely, the current collector only including the first electrically conductive layer was used. The film thickness of the electrically conductive resin film was set to 50 μm. Similar operations to those of Example 1 other than the preparation of the current collector were repeated, so as to manufacture a bipolar secondary battery.

Comparative Example 4

As for the current collector for a bipolar lithium ion secondary battery, an electrically conductive resin film was used in which 10 parts by mass of Ketjen black was mixed in 100 parts by mass of polypropylene (PP). Namely, the current collector only including the isolation resin layer was used. The film thickness of the electrically conductive resin film was set to 100 μm. Similar operations to those of Example 1 other than the preparation of the current collector were repeated, so as to manufacture a bipolar secondary battery.

<Cycle Test> The bipolar secondary battery prepared in each of Example 1 and Comparative Example 1 was charged at a constant current (CC) of 80 mA under an atmosphere of 45° C. until the battery was fully charged, and further charged at a constant voltage (CV) for 10 hours in total. Thereafter, the charged bipolar secondary battery was discharged at a constant current. This charge-discharge procedure can be regarded as a single charge-discharge cycle. A cycle test was carried out by repeating the charge-discharge cycle 20 times. Thus, a discharging capacity maintenance ratio after 20 cycles ((discharging capacity after 20 cycles)/(discharging capacity at initial cycle)×100 [%]) was calculated. Table 1 shows the results thus obtained.

<Potential Resistance Test> A test of potential resistance to the negative electrode potential was carried out on the respective bipolar secondary batteries manufactured in Examples 1 to 3 and Comparative Examples 1 to 4. In particular, a current density of each battery kept at a constant voltage of 5 mV for 150 hours was measured. The relative value of the current density in each example was calculated when the current density in Example 1 was set to 1. As the value of the current density is smaller, the battery has higher potential resistance. Table 1 shows the results thus obtained.

TABLE 1

| | First Electrically Conductive Layer (Positive Electrode Active Material Layer Side) | Second Electrically Conductive Layer (Negative Electrode Active Material Layer Side) | | | Capacity Maintenance Ratio [%] | Current Density [Relative Value] |
|---|---|---|---|---|---|---|
| | | Metal Layer | Metal Elution-Preventing Layer | Isolation Resin Layer | | |
| Example 1 | PI | Cu | — | PP | 66 | 1.0 |
| Example 2 | PI | CuO | — | PP | — | 1.0 |
| Example 3 | PI | Cu | Cr | PP | — | 1.0 |
| Comparative Example 1 | PI | Cu | — | — | 53 | 8.1 |
| Comparative Example 2 | PI | — | — | PP | — | 1.3 |
| Comparative Example 3 | PI | — | — | — | — | 13.8 |
| Comparative Example 4 | — | — | — | PP | — | 1.1 |

The results of the test of the capacity maintenance ratios revealed, as shown in Table 1, that the battery of Example 1 including the metal layer and the isolation resin layer in the PI layer as the first electrically conductive layer on the negative electrode active material layer side, has a significantly higher capacity maintenance ratio than the battery of Comparative Example 1 only including the metal layer in the PI layer on the negative electrode active material layer side. The mechanism of this effect was presumed as follows. Even when the energy level of the highest occupied molecular orbital (HOMO) of the PP layer increases due to the negative electrode potential, the provision of the PP layer serving as the isolation resin layer in the PI layer on the negative electrode active material layer side prevents the increased energy level from exceeding the oxidation-reduction potential of the lithium ions in the electrolysis solution. As a result, the permeation and absorption of the lithium ions into the current collector can be prevented so as to suppress a decrease in battery capacity.

In addition, the results of the current densities by the potential resistance test shown in Table 1 revealed that the metal layer and the isolation resin layer provided in the PI layer on the negative electrode active material layer side contribute to ensuring high potential-resistant performance.

The entire content of Japanese Patent Application No. P2011-163258 (filed on Jul. 26, 2011) is herein incorporated by reference.

Although the present invention has been described above by reference to the examples, the present invention is not limited to the descriptions thereof, and it will be apparent to those skilled in the art that various modifications and improvements can be made.

The current collector for a bipolar lithium ion secondary battery according to the present invention includes at least two electrically conductive layers. One of the electrically conductive layers included in the current collector (the first electrically conductive layer) has a constitution in which electrically conductive filler is added to the substrate containing imide group-containing resin. The other electrically conductive layer (the second electrically conductive layer) functions to isolate the lithium ions and includes the metal layer and the isolation resin layer in which electrically conductive filler is added to the substrate containing resin not containing an imide group. The bipolar electrode is characterized by being formed in a manner such that the first electrically conductive layer is located on the positive electrode active material layer side with respect to the second electrically conductive layer.

According to the present invention, the second electrically conductive layer including the isolation resin layer and the metal layer is provided in a manner such that the negative electrode active material layer is closer to the second electrically conductive layer than the first electrically conductive layer containing imide group-containing resin. As a result, the movement of the lithium ions is prevented even when exposed to the negative electrode potential. Accordingly, the absorption of the lithium ions into the resin current collector can be prevented.

The invention claimed is:

1. A current collector for a bipolar lithium ion secondary battery, comprising:
a first electrically conductive layer in which electrically conductive filler is added to a substrate containing imide group-containing resin; and
a second electrically conductive layer that functions to isolate lithium ions,
the second electrically conductive layer including an isolation resin layer and a metal layer, the isolation resin layer having a constitution in which electrically conductive filler is added to a substrate containing resin not containing imide group, and
the first electrically conductive layer being located in a manner such that a positive electrode active material layer is closer thereto than the second electrically conductive layer, wherein the second electrically conductive layer further includes a metal elution-preventing layer, the metal elution-preventing layer being located on a surface of the metal layer to face the first electrically conductive layer.

2. The current collector for a bipolar lithium ion secondary battery according to claim 1, wherein the metal layer contains at least one metal material selected from the group consisting of aluminum, nickel, copper, iron, titanium, and an alloy, a metal carbide, a metal nitride and a metal oxide of these metals.

3. The current collector for a bipolar lithium ion secondary battery according to claim 1, wherein the metal layer is thinner than the first electrically conductive layer.

4. An electrode for a bipolar lithium ion secondary battery, comprising:
the current collector according to claim 1;
a positive electrode active material layer formed on a surface of the current collector towards the first electrically conductive layer; and a negative electrode active material layer formed on a surface of the current collector towards the second electrically conductive layer.

5. A bipolar lithium ion secondary battery comprising a power generation element in which the electrode according to claim 4 and an electrolyte layer are stacked on top of each other.

* * * * *